US012800768B2

(12) United States Patent
Sun et al.

(10) Patent No.: US 12,800,768 B2
(45) Date of Patent: Nov. 17, 2026

(54) GRID AND VOXEL POSITIONING METHODS BASED ON LASER OBSERVATION DIRECTION, ROBOT, AND CHIP

(71) Applicant: AMICRO SEMICONDUCTOR CO., LTD., Zhuhai (CN)

(72) Inventors: Ming Sun, Zhuhai (CN); Hewen Zhou, Zhuhai (CN); Huibao Huang, Zhuhai (CN); Songzhou Xu, Zhuhai (CN); Zhuobiao Chen, Zhuhai (CN)

(73) Assignee: AMICRO SEMICONDUCTOR CO., LTD., Zhuhai (CN)

( * ) Notice: Subject to any disclaimer, the term of this patent is extended or adjusted under 35 U.S.C. 154(b) by 394 days.

(21) Appl. No.: 18/704,856

(22) PCT Filed: Aug. 8, 2022

(86) PCT No.: PCT/CN2022/110899

§ 371 (c)(1),
(2) Date: Apr. 25, 2024

(87) PCT Pub. No.: WO2023/071377

PCT Pub. Date: May 4, 2023

(65) Prior Publication Data

US 2024/0418858 A1 Dec. 19, 2024

(30) Foreign Application Priority Data

Oct. 25, 2021 (CN) ......................... 202111238005.4

(51) Int. Cl.
*G01S 17/89* (2020.01)
*G01S 17/08* (2006.01)
(Continued)

(52) U.S. Cl.
CPC .............. *G01S 17/89* (2013.01); *G01S 17/08* (2013.01); *G05D 1/246* (2024.01); *G05D 2109/12* (2024.01); *G05D 2111/17* (2024.01)

(58) Field of Classification Search
None
See application file for complete search history.

(56) References Cited

U.S. PATENT DOCUMENTS

2012/0083923 A1 4/2012 Matsumoto et al.
2016/0059418 A1 3/2016 Nakamura et al.
(Continued)

FOREIGN PATENT DOCUMENTS

CN 109783842 A 5/2019
CN 109783942 A 5/2019
(Continued)

OTHER PUBLICATIONS

Chinese Office Action issued in corresponding Chinese Patent Application No. 202111238005.4 dated Dec. 29, 2023, pp. 1-6.
(Continued)

*Primary Examiner* — Hovhannes Baghdasaryan
(74) *Attorney, Agent, or Firm* — PV IP PC; Wei Te Chung

(57) ABSTRACT

The present invention relates to grid and voxel positioning methods based on a laser observation direction, a robot, and a chip. The grid positioning method comprises: selecting two preset intersection points that are in a same preset grid in which a laser point is located; then, in the two preset intersection points, setting the preset intersection point farthest from an observation point as a first preset intersection point, and setting the preset intersection point closest to the same observation point as a second preset intersection point; and according to a magnitude relationship between a ratio of a second preset distance to a first preset distance and a preset
(Continued)

proportion coefficient, determining a target grid hit by the laser point in the direction of an observation ray, so as to form a latest hit grid position of the laser point within the two-dimensional grid map.

18 Claims, 4 Drawing Sheets

(51) Int. Cl.

| | |
|---|---|
| ***G05D 1/246*** | (2024.01) |
| *G05D 109/12* | (2024.01) |
| *G05D 111/10* | (2024.01) |

(56) References Cited

U.S. PATENT DOCUMENTS

| | | | |
|---|---|---|---|
| 2019/0011566 | A1 | 1/2019 | Yan et al. |
| 2020/0011015 | A1 | 1/2020 | Mijatovic et al. |
| 2020/0271787 | A1 | 8/2020 | You et al. |

FOREIGN PATENT DOCUMENTS

| | | | |
|---|---|---|---|
| CN | 112629548 | A | 4/2021 |
| CN | 112859859 | A | 5/2021 |
| CN | 113009506 | A | 6/2021 |
| CN | 113537202 | A | 10/2021 |
| DE | 102018117239 | B3 | 9/2019 |
| JP | 2007264952 | A | 10/2007 |
| JP | 2015154144 | A | 8/2015 |
| JP | 2017211934 | A | 11/2017 |
| WO | 2020183658 | A1 | 9/2020 |

OTHER PUBLICATIONS

Chinese Notice of Allowance issued in corresponding Chinese Patent Application No. 202111238005.4 dated Mar. 15, 2024, pp. 1-4.

Japanese Notice of Allowance issued in corresponding Japanese Patent Application No. 2024-524496 dated Mar. 11, 2025, pp. 1-3.

Journal of Henan Polytechnic University ( Natural Science ) 40 Issue 5 Sep. 30, 2021 Fast computation of complex geometric distance fields based on an improved ray intersection method Hongmei Zhou etc.

2012 IEEE Intelligent Vehicles Symposium Issue Jul. 5, 2021 3D LIDAR point cloud based intersection recognition for autonomous driving Quanwen Zhu etc.

European Office Action issued in corresponding European Patent Application No. 22885277.8 dated Oct. 14, 2025, pp. 1-8.

International Search Report in International application No. PCT/CN2022/110899, mailed on Oct. 20, 2022.

Written Opinion of the International Search Authority in International application No. PCT/CN2022/110899, mailed on Oct. 20, 2022.

GRID AND VOXEL POSITIONING METHODS BASED ON LASER OBSERVATION DIRECTION, ROBOT, AND CHIP

CROSS REFERENCE TO RELATED APPLICATIONS

This application is a National Phase of PCT Patent Application No. PCT/CN2022/110899 having International filing date of Aug. 8, 2022, which claims the benefit of priority of Chinese Patent Application No. 2021112380054, filed Oct. 25, 2021, the contents of which are all incorporated herein by reference in their entirety.

TECHNICAL FIELD

The disclosure relates to the technical field of map positioning, and in particular to a grid and voxel positioning method based on laser observation directions, a robot and a chip.

BACKGROUND

For a mobile robot that uses laser ranging and positioning, it can build an environmental map around a robot body for continuous positioning, navigation, obstacle avoidance, etc. If the environmental map is a two-dimensional grid map or a three-dimensional grid map, some technical solutions for implementing in-room positioning, point cloud matching, map updating, etc., all involve the problem of which specific grid the laser point hits. Thus, it is necessary to determine in which grid the laser point (laser point cloud) falls by searching and updating. However, due to a fact that the direction to observe the laser point is not taken into account, positioning accuracy is reduced for the two-dimensional grid map or the three-dimensional grid map.

SUMMARY OF THE INVENTION

The present invention discloses a grid positioning method, a voxel positioning method, a robot and a chip. The specific technical schemes are provided as follows. A grid positioning method based on laser observation direction is disclosed. The grid positioning method comprises: selecting two preset intersection points that are in a preset grid in which a laser point is located; then among the two preset intersection points, setting a preset intersection point farthest from an observation point as a first preset intersection point, and setting a preset intersection point closest to the observation point as a second preset intersection point; wherein, both the first preset intersection point and the second preset intersection point are intersection points of an observation ray and an corresponding edge of the preset grid; determining a target grid hit by the laser point in a direction of the observation ray according to a magnitude relationship between a ratio of a second preset distance to a first preset distance and a preset proportion coefficient, so as to form a latest hit grid position of the laser point within a two-dimensional grid map; wherein the first preset distance is a distance between the first preset intersection point and the second preset intersection point, and the second preset distance is a distance between the laser point and the second preset intersection point; and wherein the observation ray is a ray directed from the observation point to the laser point, and the observation ray does not coincide with an edge of a grid; the observation point is a position marked by the laser sensor in the two-dimensional grid map.

Alternatively, the step for determining a target grid hit by the laser point in the direction of the observation ray according to a magnitude relationship between a ratio of a second preset distance to a first preset distance and a preset proportion coefficient comprising: when the ratio of the second preset distance to the first preset distance is greater than the preset proportional coefficient, determining that the target grid hit by the laser point in the direction of the observation ray is a neighborhood grid of the preset grid in the direction of the observation ray; when the ratio of the second preset distance to the first preset distance is not greater than the preset proportional coefficient, determining that the target grid hit by the laser point in the direction of the observation ray is the preset grid; wherein, the direction of the observation ray is a direction from the observation point to the laser point, which is used to indicate a laser observation direction emitted from the observation point.

Alternatively, when the laser point is located on an edge of the grid, the laser point is the second preset intersection point, the ratio of the second preset distance to the first preset distance is equal to 0, so that the first grid that is continuously passed through by the observation ray after passing through the laser point becomes the target grid, wherein the preset proportional coefficient is greater than 0.

Alternatively, the first preset intersection point and/or the second preset intersection point are allowed to be located at vertices of the preset grid, so that the target grid is a grid having only one common vertex with the preset grid the grid; wherein, the first preset intersection point and the second preset intersection point are respectively located on different edges of the preset grid.

Alternatively, the grid positioning method further comprising the following steps: in the case where the observation ray coincides with an edge of a grid in the two-dimensional grid map, if the laser point is not located at a vertex of the grid, one of two grids having a common edge of a grid where the laser point is located is selected as the target grid hit by the laser point in the direction of the observation ray; in the case where the observation ray coincides with an edge of a grid in the two-dimensional grid map, if the laser point is located at a vertex of the grid, among four grids having a common vertex with the vertex where the laser point is located, one of two grids that are farthest from the observation point is selected as the target grid hit by the laser point in the direction of the observation ray, wherein the two grids that are farthest from the observation point are two adjacent grids located in the same row or in the same column.

Alternatively, in a map coordinate system of the two-dimensional grid map, coordinates of each grid refer to coordinates of a lower left corner point of the grid, coordinates of the upper left corner point of the grid, coordinates of the lower right corner point of the grid, coordinates of the upper right corner point of the grid or coordinates of center position of the grid; wherein, coordinates of corner points at a relevant edge or a central position of the grid are used to represent row serial number of the grid and column serial number of the grid in the two-dimensional grid map.

Alternatively, a neighborhood grid of the preset grid is a grid having a common edge or a common vertex with the preset grid; a neighborhood grid of the preset grid in the direction of the observation ray is an adjacent grid searched along the direction of the observation ray taking the preset grid as a search starting point; wherein, a formality in which the laser point is located on the preset grid comprises situations that the laser point is located in an area surrounded by four edges of the preset grid, and that the laser point is located on an edge of the preset grid, so as to reflect a two-dimensional position information of a scanned object.

Alternatively, if a column serial number of the preset grid is obtained as s0 and a row serial number of the preset grid is obtained as h0, then in the two-dimensional grid map, a neighborhood grid of the preset grid exists in grids of which the numerical range of the row serial number is [h0−1, h0+1] and the numerical range of the column serial number is [s0−1, s0+1].

A voxel positioning method based on a laser observation direction is disclosed, the voxel positioning method comprises: selecting two preset intersection points that are in a preset voxel in which a laser point is located; then among the two preset intersection points, setting a preset intersection point farthest from an observation point as a first preset intersection point, and setting a preset intersection point closest to the observation point as a second preset intersection point; wherein the first preset intersection point and the second preset intersection point are both intersection points of an observation ray and a corresponding face of the preset voxel; determining a target voxel hit by the laser point in a direction of the observation ray according to a magnitude relationship between a ratio of a second preset distance to a first preset distance and a preset proportion coefficient, so as to form a latest hit voxel of the laser point within the three-dimensional grid map; wherein the first preset distance is a distance between the first preset intersection point and the second preset intersection point, and the second preset distance is a distance between the laser point and the second preset intersection point; wherein the observation ray is a ray directed from the observation point to the laser point, and the observation ray is configured to pass through different faces of a voxel, but the observation ray does not coincide with an edge of a voxel; and wherein the observation point is a position marked by the laser sensor in the three-dimensional grid map; the laser point is a laser point cloud converted from a laser reflection information collected by a laser sensor into the three-dimensional grid map.

Alternatively, the step for determining a target voxel hit by the laser point in the direction of the observation ray according to a magnitude relationship between a ratio of a second preset distance to a first preset distance and a preset proportion coefficient comprising: when the ratio of the second preset distance to the first preset distance is greater than the preset proportional coefficient, determining that the target voxel hit by the laser point in the direction of the observation ray is a neighborhood voxel of the preset voxel in the direction of the observation ray; and when the ratio of the second preset distance to the first preset distance is not greater than the preset proportional coefficient, determined that the target voxel hit by the laser point in the direction of the observation ray is the preset voxel; wherein the direction of the observation ray is a direction from the observation point to the laser point.

Alternatively, when the laser point is located on a face of the voxel of the three-dimensional grid map, the laser point is the second preset intersection point, then the ratio of the second preset distance to the first preset distance is equal to 0, so that the target voxel hit by the laser point in the direction of the observation ray becomes the preset voxel, wherein the preset proportional coefficient is greater than 0.

Alternatively, the first preset intersection point and/or the second preset intersection point are located on edges of the preset voxel, so that the target voxel is a voxel having only a common vertex or a common edge with the preset voxel; wherein the first preset intersection point and the second preset intersection point are located on different faces of the preset voxel.

Alternatively, when the observation ray is located on a face of a voxel in the three-dimensional grid map, the voxel positioning method also comprises the following steps: in the case where the observation ray does not coincide with an edge of the voxel in the three-dimensional grid map, if the laser point is not located at a vertex of the voxel, one of two voxels having a common face where the laser point is located is selected as the target voxel hit by the laser point in the direction of the observation ray; in the case where the observation ray coincides with an edge of the voxel in the three-dimensional grid map, if the laser point is not located at a vertex of the voxel, one of four voxels having a common edge with the edge of the voxel where the laser point is located is selected as the target voxel hit by the laser point in the direction of the observation ray; and if the laser point is located at a vertex of the voxel, then among eight voxels having a common vertex with the vertex where the laser point is located, a voxel with the largest vertical distance from the observation point is selected as the target voxel hit by the laser point in the direction of the observed ray.

Alternatively, in a three-dimensional map coordinate system of the three-dimensional grid map, coordinates of each voxel refer to coordinates of one of vertices of the voxel or coordinates of a central position of the voxel.

Alternatively, a neighborhood voxel of the preset voxel is a voxel that shares common edges or common vertices with the preset voxel; a neighborhood voxel of the preset voxel in the direction of the observation ray is an adjacent voxel searched along the direction of the observation ray taking the preset voxel as a search starting point; wherein a formality in which the laser point is located on the preset voxel includes situations that the laser point is located within a space area surrounded by eight faces of the preset voxel, and that the laser point is located on a face of the preset voxel; and wherein a formality that the laser point is located on a face of the preset voxel includes situation that the laser point is located at a vertex of the preset voxel.

Alternatively, if a serial number of an abscissa axis direction of the preset voxel is s0, a serial number of an ordinate axis direction of the preset voxel is h0, and a serial number of an applicate axis direction of the preset voxel is z0, then in the three-dimensional grid map, the neighborhood voxel of the preset voxel exists in voxels of which numerical range of the serial number in the abscissa axis direction is [s0−1, s0+1], and numerical range of the serial number in the ordinate axis direction is [h0−1, h0+1], and the numerical range of the serial number in the applicate axis direction is [z0−1, z0+1], wherein, s0 is an integer, h0 is an integer, and z0 is an integer.

A robot is disclosed, the robots comprises: a robot main body; a walking mechanism arranged on the robot main body; a laser sensor disposed on the robot main body, the laser sensor being configured to collect laser information reflected from a scanned object to obtain laser points, so as to form a laser point cloud; and a controller, the controller being equipped in the robot main body and connected to the laser sensor; wherein the controller comprises at least one processor and a memory, the memory is connected in communication with the at least one processor, the memory stores instructions executable by the at least one processor, and the instructions are executed by the at least one processor, to make the robot implement a grid positioning method based on the laser observation direction, and/or a voxel positioning method based on the laser observation direction.

A chip is disclosed. The chip stores computer-executable instructions, and when the computer-executable instructions are executed by the chip, a grid positioning method based on the laser observation direction, and/or a voxel positioning method based on the laser observation direction are implemented.

Compared with the prior art, the beneficial technical effect of the present invention is that: the present invention sets the position of the laser sensor as the observation point, and select two intersection points having significant meaning on positioning and distance from the intersection points of the grid and the ray formed by the observation point pointing to the laser point in the grid map along the observation direction of the observation point pointing to the laser point in the grid map (that is, the laser observation direction). Then, a latest hit grid position of the laser point within the grid map is determined by the ratio between the distance between the laser point and the intersection point with the closest distance to the observation point and the distance of the aforementioned two intersection points, so as to form a map positioning concept that determines the grid hit by the laser point in the map by the proximity of the laser point to the surrounding grids, the map positioning concept of the grid position can achieve a grid with a smaller positioning error with the actual physical position in the two-dimensional grid map, and can also obtain a voxel (short for voxel grid) with smaller positioning error with the actual physical position in the three-dimensional grid map.

DETAILED DESCRIPTION

Figure 1:
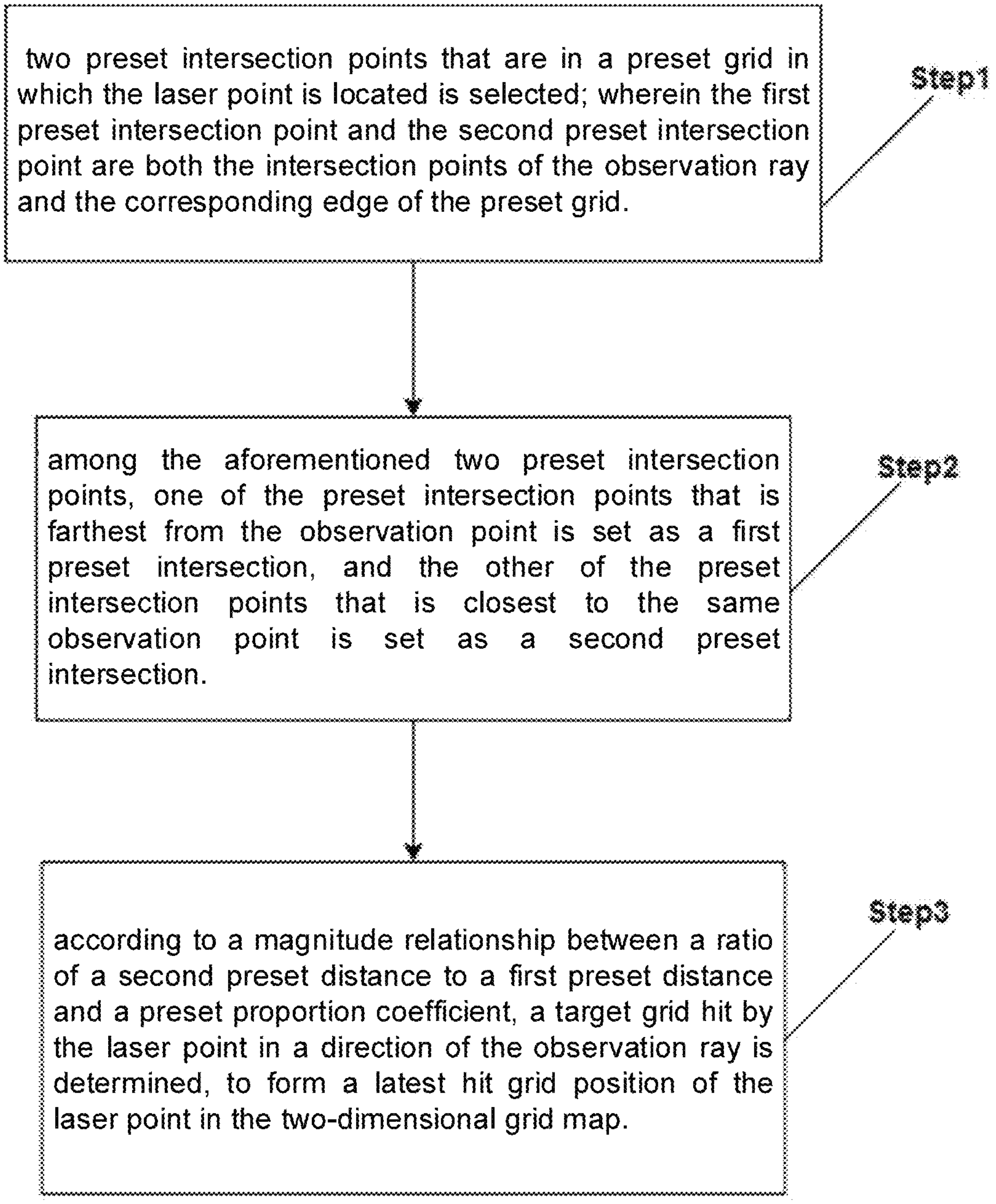
FIG. 1 is a flowchart of a grid positioning method based on a laser observation direction as disclosed in an embodiment of the present invention.

The technical solutions in the embodiments of the present invention will be described in detail below with reference to the drawings in the embodiments of the present invention. In the case of no conflict, the following embodiments and features in the embodiments can be combined with each other. In the following description, specific details are given to provide a thorough understanding of the embodiments. However, one of ordinary skill in the art would understand that the embodiments may be practiced without these specific details. For example, circuits may be shown in block diagrams in order not to obscure the embodiments in unnecessary detail. In other instances, well-known circuits, structures and techniques have not been shown in detail in order not to obscure the embodiments.

It should be noted that whether it is a two-dimensional grid map or a three-dimensional grid map, it includes information indicating the probability of obstacles in a specific location or area. The laser sensor of the mobile robot can scan the object to be measured to obtain position information of the object to be measured, and on this basis, the probability information of the object to be measured falling into the corresponding grid position of the map is calculated. At different times in a same posture of the mobile robot, the detection distance to a fixed obstacle (object to be measured) by the laser sensor is inconsistent. It is possible that the detection distance involved in one frame of laser data collected at one moment is 5 m. The detection distance involved in one frame of laser data collected at another moment is 5.1 m. In order not to simultaneously mark the positions of 5 m and 5.1 m as the aforementioned fixed obstacles, it is necessary to use the occupancy grid map construction algorithm to calculate an aforementioned probability information of the fixed obstacle falling into (hitting) the corresponding grid position of the map, and then to determine the precise position of the aforementioned fixed obstacle in the map based on the magnitude of the probability value. The space occupied by the size of the mobile robot is usually not considered in current art. Therefore, in the present invention, the mobile robot is regarded as one point no matter whether the map changes or not.

Specifically, a grid map with a certain resolution is composed of a certain number of laser scanning points (which can be referred to as laser points for short), and is specifically constructed from a probability grid [Pmin, Pmax] with a size of 5 cm*5 cm. Whether it is a two-dimensional grid map or a three-dimensional grid map, when the map has been created, if the grid probability is less than Pmin, it means that there is no obstacle at the grid; if the grid probability is between Pmin and Pmax, it means unknown; and if the grid probability is greater than Pmax, it means that there is an obstacle at the grid. The laser scanning points of each frame will generate a set of grids. In this set of grids, each grid is given an occupancy probability value. If the grid already has a probability value, the probability value of this grid needs to be updated.

Further, for a fixed scanned object, the laser sensor can be moved to obtain as much information as possible on the surface of the object. When a beam of laser light hits the surface of the scanned object, the reflected laser information can carry position, distance and other information. Point clouds can be obtained by incorporating the principles of laser measurement and photogrammetry, including three-dimensional coordinates (XYZ), laser reflection intensity (Intensity) and color information (RGB). After obtaining the spatial coordinates of each sampling point on the surface of the scanned object, a set of points is obtained, a set of points is called a point cloud, so that the point cloud is also a collection of massive points on the surface characteristics of the scanned object. When the 3D data obtained from different observation points (understood as laser sensors located at different positions or laser sensors moving to different positions in sequence) have a certain of overlapping and can completely cover the scanned object, it means that sufficient 3D point cloud data for the surface has been obtained, in which point clouds obtained from different observation points are uniformly transformed into a map coordinate system.

As a first embodiment, a grid positioning method based on laser observation direction is disclosed. The subject to execute the grid positioning method is a mobile robot equipped with a laser sensor, wherein the laser sensor is configured to collect the laser information reflected from a scanned object. The laser information is converted by the controller inside the mobile robot into a point in the map constructed instantly. This point can represent a serial number of a grid having the scanning position, which is transferred from the world coordinate system to the two-dimensional grid coordinate system. Each serial number of the grid includes two characters, x and y, which are related to the map resolution. For example, when the map resolution is 0.05, it means that there are 20 grids in an actual physical environment of 1 m. As shown in FIG. 1, the grid positioning method includes step 1 to step 3. In step 1, two preset intersection points that are in a preset grid in which the laser point is located is selected. in some embodiments, it is done by searching for the two preset intersections that are in the same preset grid in which the laser point is located along the direction of the observation ray; wherein, the first preset intersection point and the second preset intersection point are both the intersection points of the observation ray and the corresponding edge of the preset grid. The first preset intersection point and the second preset intersection point are respectively located on different edges of the preset grid. Then Step 2 is entered. On the observation ray, the laser point and the aforementioned two preset intersection points are in the same grid, including on the edge of the grid, or inside the grid area surrounded by the four edges of the grid (but not including its edges). In this embodiment, this type of grid is defined as a preset grid. The observation ray is a ray directed from the observation point to the laser point, and the observation ray does not coincide with the edge of the grid. Specifically, the observation ray does not coincide with any side of the preset grid. The observation point is the position marked by the laser sensor in the two-dimensional grid map. Preferably, the observation point is used to indicate a specific location of the probe of the laser sensor, i.e., a position actually sending/receiving signal.

In step 2, among the aforementioned two preset intersection points, one of the preset intersection points that is farthest from the observation point is set as a first preset intersection, and the other of the preset intersection points that is closest to the same observation point is set as a second preset intersection. Then, Step 3 is entered. Therefore, in Step 2, by means of setting the first preset intersection point and the second preset intersection point on the same ray as the mapping points of the laser point at the intersection edge of the observed ray and the corresponding grid, so that the distance relationship between the two intersection positions and the observation point is also established.

In Step 3, according to a magnitude relationship between a ratio of a second preset distance to a first preset distance and a preset proportion coefficient, a target grid hit by the laser point in a direction of the observation ray is determined, to form a latest hit grid position of the laser point in the two-dimensional grid map, so as to obtain a grid having a smaller localization error with the actual physical locations within the two-dimensional grid map. Thus, a grid having a reasonable distance in the nearby region of the currently hit grid in the map along the direction of the observed ray can be configured as a target grid and updated to the currently hit grid in the two-dimensional grid map. Compared with the existing technology, it is not necessary to obtain the occupancy probability value of the grid by calculation and comparison. Moreover, the first preset distance is a distance between the first preset intersection point and the second preset intersection point, and the second preset distance is a distance between the laser point and the second preset intersection point. These distances are all calculated under the coordinates of the described two-dimensional grid map. In actually calculating the relevant distance information, it is necessary to calculate each laser point and the grid serial number of a grid it hits in the two-dimensional grid coordinate system. Among them, the specific setting of the preset proportion coefficient can be adjusted adaptively according to the actual test results to adapt to the errors existing in the grid map constructed by the robot. Specifically, the grid map constructed by the laser is divided according to the grid resolution. The grid map constructed by the laser divides the pixel pictures according to the grid resolution, and in the pixel pictures, the environmental information represented by the map will deviate from the actual situation. For example, there are problems in the map, such as jagged straight line segments, layered superposition of line segments, noise in line segments and so on.

It should be noted that the laser point is the coordinate point in the grid map converted from the laser information collected by the laser sensor and the laser information is reflected from the scanned object. The laser point belongs to the laser scanning point or the laser sampling point, and the laser point reflects the position information (including surface detection distance and detection angle to the scanned object) and laser reflection intensity. Specifically, if the laser sensor scans the laser beam to the scanned object according to a certain trajectory, it will record the reflected laser point information while scanning. As the scanning is extremely fine, a large number of laser points can be obtained, so the laser point cloud can be formed. Among them, the laser sensor is generally a laser radar that supports 360-degree rotation scanning, with a laser emitting probe and a receiving probe. In some implementations, after the laser point is processed, the specific surface features encountered by the laser can be classified, and then the floor, furniture, walls, and any objects encountered by the laser beam during the measurement process in the room constitute the data of laser point cloud, to realize the determination of the position of these objects. Specifically, the laser information reflected from the scanned object collected by the laser sensor comprises a laser radar data packet, and the laser radar data packet comprises data of several frames of laser point cloud, and the data of each frame of laser point cloud includes several scanning points. Each scanning point contains angle (counterclockwise is positive direction) and distance.

On the basis of the above embodiments, the method for determining a target grid hit by the laser point in the direction of the observation ray according to a magnitude relationship between a ratio of a second preset distance to a first preset distance and a preset proportion coefficient comprises: when the ratio of the second preset distance to the first preset distance is greater than the preset proportional coefficient, it is determined that the target grid hit by the laser point in the direction of the observation ray is a neighborhood grid of the preset grid in the direction of the observed ray, and that the target grid is also the nearest grid to the laser point searched along the direction of the observation ray; when the ratio of the second preset distance to the first preset distance is not greater than the preset proportional coefficient, it is determined that the target grid hit by the laser point in the direction of the observation ray is the preset grid, so that the grid where the laser point is originally located is taken as the target grid; wherein, the direction of the observation ray is a direction from the observation point to the laser point, which is used to represent a laser observation direction emitted from the observation point. Thus, by means of selecting the grid with a smaller gap with the actual physical location from the dimension of the direction, a positioning accuracy and mapping quality can be improved. Based on the aforementioned correlation distance ratio being greater than 0, the preset proportional coefficient is preferably greater than 0.

In summary, compared with the prior art, the present invention sets the position of the laser sensor as the observation point, and then select two intersection points having significant meaning on positioning and distance from the intersection points of the grid and the ray formed by the observation point pointing to the laser point in the grid map along the observation direction of the observation point pointing to the laser point in the grid map (that is, the laser observation direction). Then, a latest hit grid position of the laser point within the grid map is determined by the ratio between the distance between the laser point and the intersection point with the closest distance to the observation point and the distance of the aforementioned two intersection points, so as to form a map positioning concept that determines the grid hit by the laser point in the map by the proximity of the laser point to the surrounding grids, and obtain a grid with a smaller positioning error with the actual physical location in the two-dimensional grid map.

Figure 2:
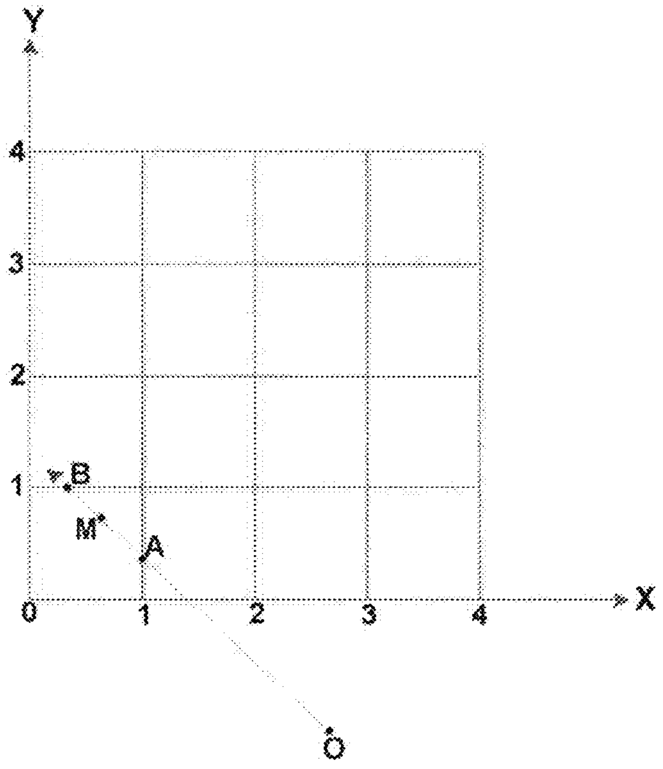
FIG. 2 is a schematic diagram of a ray OM passing through a grid in a two-dimensional grid map disclosed by an embodiment of the present invention.
Figure 3:
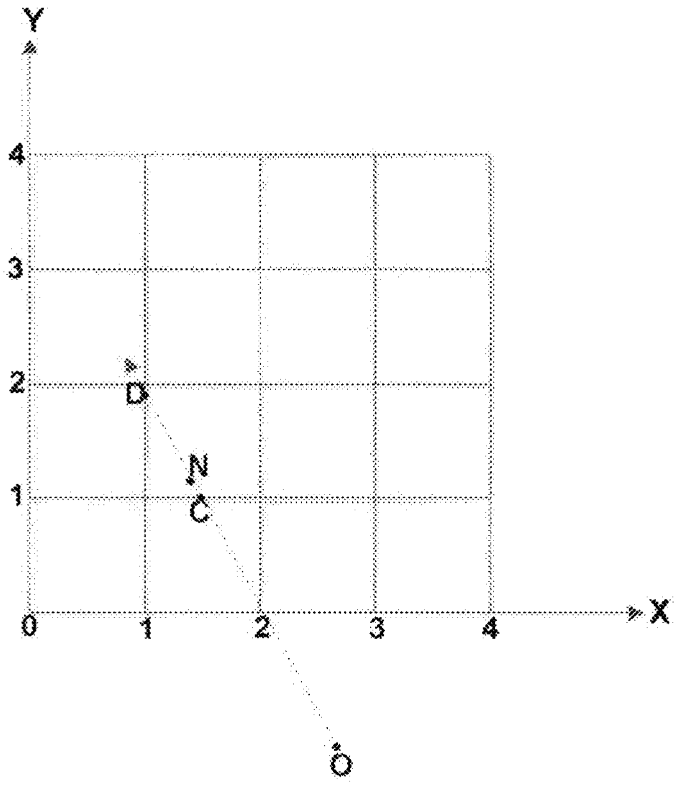
FIG. 3 is a schematic diagram of a ray ON passing through a grid in a two-dimensional grid map disclosed by an embodiment of the present invention.
Figure 4:
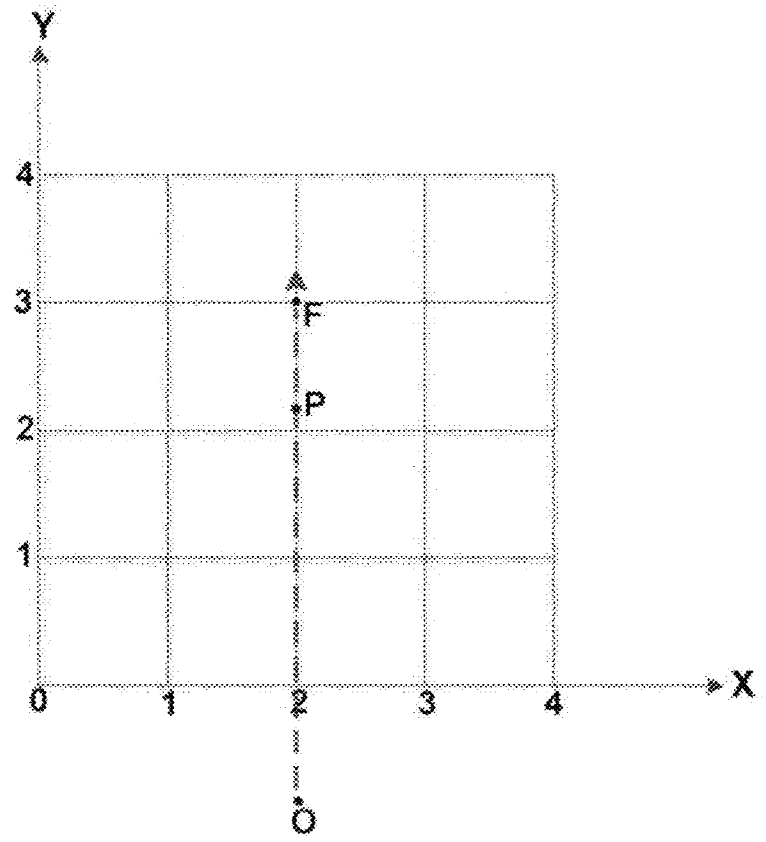
FIG. 4 is a schematic diagram of a ray OP passing through a grid in a two-dimensional grid map disclosed by an embodiment of the present invention.

Combining the grid maps in FIG. 2 to FIG. 4, it can be seen that the grids in the illustrated two-dimensional grid map are regularly arranged, and the grids in the two-dimensional grid map are regularly arranged in rows and columns, taking point O as the grid position occupied by the laser sensor of the robot. The grid at point M of FIG. 2 is the preset grid, and there are 3 grids adjacent to the grid where point M in FIG. 2 is located. The grid at point N of FIG. 3 is also the preset grid, and there are 8 grids adjacent to the grid where point N in FIG. 3 is located. Therefore, in this embodiment, the neighborhood grid of the preset grid is a grid having a common edge or a common vertex with the preset grid. A definition that the laser point is located on the preset grid comprises a situation that the laser point is located in an area surrounded by four edges of the preset grid and a situation that the laser point is located on a side of the preset grid, so as to reflect the two-dimensional position information of a scanned object. It should be noted that, in the above embodiment, a neighborhood grid of the preset grid in the direction of the observation ray is an adjacent grid searched along the direction of the observation ray with the preset grid as a search starting point, that is the neighborhood grid of the preset grid in the direction of the observation ray is searched from the preset grid along the direction of the observation ray. For an adjacent grid that is searched, the direction of the observation ray is indicated by the arrow of the ray OM in FIG. 2, or the direction of the observation ray is indicated by the arrow of the ray ON in FIG. 3. Therefore, along the direction of the preset observation ray, the target grid is searched from the surrounding area of the laser point including the grid position where it is located, which reduces the computational complexity and improves the positioning speed of the laser point.

Specifically, if a column number of the preset grid is obtained as s0, and a row number of the preset grid is h0, then in the two-dimensional grid map, a neighborhood grid of the preset grid exists in grids of which the numerical range of the row number is [h0−1, h0+1] and the numerical range of the column number is [s0−1, s0+1], wherein, s0 is an integer and h0 is an integer. Preferably, in the grid map shown in FIG. 2, the row number of the grid where the M point in FIG. 2 is located is 0, and the column number of the grid where the M point in FIG. 2 is located is 0, then the numerical range of the row number of the neighborhood grid of the grid where the M point is located is [0,1], and the numerical range of the column number is [0,1]. Preferably, in the grid map shown in FIG. 3, the row number of the grid where point N is located is 1, and the column number of the grid where point M is located in FIG. 2 is 1, then the numerical range of the row number of the neighborhood grid of the grid where point N is located in FIG. 3 is [0, 2], and the numerical range of the column number of the neighborhood grid of the grid where point N is [0, 2]. From the grid maps shown in FIG. 2 to FIG. 3, it can be seen that the row number of the neighborhood grid is within the range from the previous row to the next row of the preset grid, and the neighborhood grid is within the range from the previous column to the next column of the preset grid. Therefore, under the premise that s0 and h0 are known, the preset grids are excluded from grids where the numerical range of the row number is [h0−1, h0+1] and the numerical range of the column number is [s0−1, s0+1], and the remaining grids are the neighborhood grids of the preset grids, so that the laser point is located in a grid having matched row number and column number in the two-dimensional grid map. Therefore, this embodiment can uniquely determine a grid according to the row numbers and the column numbers in the grid map.

In some embodiments, in the map coordinate system of the two-dimensional grid map, that is, in the aforementioned two-dimensional grid coordinate system, the coordinates of each grid are the coordinates of the lower left corner point of the grid, the coordinates of the upper left corner point of the grid, the coordinates of the lower right corner point of the grid or the coordinates of the upper right corner point of the grid. In some implementation scenarios, the center position of the grid is used to represent the real geographic location of the scanned area, and the coordinates of each grid can also be the coordinates of the central position of that grid. The coordinates of the relevant corner points or the central position of the grid can represent the row number and the column number of the grid in the two-dimensional grid map, the abscissa is equal to the column number, and the ordinate is equal to the row number. As shown in the grid maps in FIG. 2 to FIG. 4, when traversing the grid from left to right, the column number increases gradually; when traversing the grid from bottom to top, the row number gradually increases. Therefore, it is ensured that the paths generated by grid-by-grid connections in the two-dimensional grid map are continuous. For ease of understanding, in the map coordinate systems shown in FIG. 2 to FIG. 4, the coordinates of the lower left corner point of grid are used to represent the coordinates of the grid.

As a second embodiment, as shown in FIG. 2, the observation point is marked as point O, the laser point collected and converted by the laser sensor is marked as point M, the observation point O points to the laser point M to form the observation ray OM, and the grid where the laser point M is located is the preset grid. Then, the observation ray OM intersects the corresponding edges of the preset grid at point A and point B, that is, the observation ray OM intersects the same grid at point A and point B, and at the same time, the observation ray OM does not coincide with any edge of the preset grid. The distance between point A and observation point O is greater than the distance between point B and observation point O, then the distance between point A and point B is defined as the first preset distance AB, the distance between point A and laser point M is defined as the second preset distance MA. The first preset intersection point is marked as point B, and the second preset intersection point is marked as point A. On this basis, along the direction of the observation ray OM, the first preset intersection point B, the second preset intersection point A and the laser point M located on the same preset grid can be selected. The first preset intersection point B and the second preset intersection point A can be understood as the mapping point of the laser point M on the edge where the observation ray OM intersects with the corresponding grid. In the second embodiment, when the ratio of the second preset distance MA to the first preset distance AB is greater than the preset proportional coefficient, it is determined that the target grid hit by the laser point M in the direction of the observation ray OM is the neighborhood grid of the preset grid in the direction of the observation ray OM, which is the nearest grid to the laser point M searched along the direction of the observation ray OM. That is, the target grid in the FIG. 2 is the grid that is in the upper row of the same column of the arrow of the observation ray OM pointing to the preset grid. Correspondingly, in the map coordinate system shown in FIG. 2, the coordinates of the grid are represented by the coordinates of the lower left corner point of the same grid, the coordinates of the grid (the preset grid) where the laser point M are located are (0, 0), and the coordinates of the target grid hit by the laser point M in the direction of the observed ray OM are (0,1). In the second embodiment, when the ratio of the second preset distance MA to the first preset distance AB is not greater than the preset proportional coefficient, it is determined the target grid hit by the laser point M in the direction of the observation ray OM is the preset grid, the target grid in FIG. 2 is the original grid where the laser point M is located. Correspondingly, in the map coordinate system shown in FIG. 2, the coordinates of the grid in FIG. 2 are represented as the coordinates of the lower left corner point of the grid, and the coordinates of the grid in which the laser point M are located (the preset grid) are (0,0), and the coordinates of the target grid hit by the laser point M in the direction of the observed ray OM are (0,0). Obtaining a grid with a smaller distance error from the actual physical location in the two-dimensional grid map is thus realized.

On the basis of the foregoing embodiments, when the ratio of the second preset distance to the first preset distance is greater than the preset proportional coefficient, it can be deduced that the direction of the observation ray determines that the distribution direction of the target grid hit in the direction relative to the preset grid where the laser point is located, which is referred to as the neighborhood grid direction, comprising the direction indicated by the arrows of the rays shown in FIG. 2 to FIG. 3. The neighborhood grid direction is divided into the upper left of the preset grid, the lower left of the preset grid, the upper right of the preset grid, the lower right of the preset grid, the directly above the preset grid, the directly below the preset grid, directly to the left of the preset grid, and directly to the right of the preset grid. Each of the neighborhood grid directions can refer to the second embodiment corresponding to FIG. 2 to determine the target grid corresponding to the direction of the observation ray. No drawings nor texts will be made for description here, and just the relevant observation rays and grids in the second embodiment are adaptively adjusted.

As a preferred embodiment, when the laser point is located on the edge of the grid, the laser point is the second preset intersection point. In the preferred embodiment, the laser point can only be set as the second preset intersection point, and the laser point can only be used as the preset intersection point closest to the same observation point among the two preset intersection points where the observation ray intersects the edge of the grid. The observation ray does not coincide with either edge of the grid, and the ratio of the second preset distance to the first preset distance is equal to 0. The preset proportional coefficient is greater than 0, so that the target grid hit by the laser point M in the direction of the observation ray OM is the preset grid. Therefore, when the laser point falls on the edge of the grid, the first grid that is continuously passed through by the observation ray after passing through the laser point is selected as the target grid, so as to draw closer to the distance between the target grid and the laser point. Referring to FIG. 2 a shifting of the position of the laser point M can be explained. When the laser point M falls into the position of point A, the observation ray OM intersects the corresponding edge of the preset grid (0, 0) at point M and point B, the second preset intersection point can only be marked as point M, then the first preset intersection point is marked as point B, and the distance between point M and point B is defined as the first preset distance MB, and the distance between the point A and the laser point M is defined as the second preset distance. Therefore, the second preset distance is equal to 0, and the ratio of the second preset distance MA to the first preset distance AB is equal to 0, which is less than the preset proportional coefficient. In this situation, the preset grid (0, 0) is selected as the target grid hit by the laser point M in the direction of the observation ray OM, wherein the preset proportional coefficient is greater than 0.

When the laser point falls on the edge of the grid, based upon the above concept of selecting the first grid that is continuously passed through by the observation ray after passing through the laser point as the target grid and continuing to refer to FIG. 2 a shifting of the position of the laser point M can be explained. When the laser point M falls into the position of point B, the observation ray OM intersects the corresponding edge of the grid (0, 0) at point M and point A, and the observation ray OM intersects the corresponding edge of the grid (0, 1) at point M and a new point. In this situation, the new point of intersection is located on the Y axis (not shown in the figure), and the grid (0, 1) is updated to the preset grid. The second preset intersection point is marked as point M, then the first preset intersection point is marked as a new point of intersection on the Y axis. As for the straight distance between the second preset intersection point M and the laser point M is equal to 0, then the second preset distance is equal to 0. Therefore, the ratio of the second preset distance to the first preset distance is equal to 0, which is smaller than the preset proportional coefficient. In this situation, the grid (0, 1) is selected as the target grid hit by the laser point M in the direction of the observation ray OM, wherein the preset proportional coefficient is greater than 0. Among them, grid (0, 1) is the grid whose coordinates are (0, 1), and grid (0, 0) is the grid whose coordinates are (0, 0).

As a third embodiment, the first preset intersection point and/or the second preset intersection point are located at the vertices of the preset grid. In this situation, the first preset intersection point and the second preset intersection point are respectively located on corresponding edges of the preset grid, and the target grid is adjusted to a grid having only one common vertex with the preset grid. As shown in FIG. 3, the observation point is marked as point G, the laser point collected and converted by the laser sensor is marked as point N, the observation point O points to the laser point N to form the observation ray ON, and the grid where the laser point N is located is the preset grid. Moreover, the observation ray ON intersects the corresponding edges of the preset grid at point C and point D, wherein the observation ray ON intersects the upper left corner of the preset grid at point D, and the observation ray ON intersects with an edge of the preset grid intersects at point C. In some embodiments, point C may be the vertex of the lower right corner point of the preset grid, but cannot be the vertex of the lower left corner of the preset grid, so as to avoid the observation ray ON to coincide with the left edge of the preset grid. Since the distance between point D and observation point O is greater than the distance between point C and observation point O, the first preset intersection point is marked as point D, and the second preset intersection point is marked as point C, the distance between point D and point C is defined as the first preset distance CD, and the distance between point C and laser point N is defined as the second preset distance NC. On this basis, the first preset intersection point D, the second preset intersection point C and the laser point N located on the same preset grid can be selected along the direction of the observation ray ON. The first preset intersection point D and the second preset intersection point C can be understood as the mapping points of the laser point N on the edge where the observation ray ON intersects with the corresponding grid, that is, the mapping points that are mapped at the intersection edge of the observed ray ON and the corresponding grid by the laser point N. In the embodiment three, when the ratio of the second preset distance NC to the first preset distance DC is greater than the preset proportional coefficient, it is determined that the target grid hit by the laser point N in the direction of the observation ray ON is the neighborhood grid of the preset grid in the direction of the observation ray ON, which is a grid closest to the laser point N searched along the direction of the observation ray ON. Then, the target grid in the FIG. 3 is the grid that is in the upper row of the previous column of the arrow of the observation ray ON pointing to the preset grid, that is, the grid located at the upper left of the preset grid and the target grid has only one common vertex with the preset grid. Correspondingly, in the map coordinate system shown in FIG. 3, the coordinates of the grid are represented by the coordinates of the lower left corner point of the grid, then the coordinates of the grid where the laser point N is located (the preset grid) are (1, 1), and the coordinates of the target grid hit by the laser point N in the direction of the observation ray ON are (0, 2). In the this embodiment, when the ratio of the second preset distance NC to the first preset distance CD is not greater than the preset proportional coefficient, it is determined that the target grid hit by the laser point N in the direction of the observation ray ON is the preset grid, the target grid in FIG. 3 is the original grid where the laser point N is located, correspondingly, in the map coordinate system shown in FIG. 3, the coordinates of the grid are represented by the coordinates of the lower left corner point of the grid, then the coordinates of the grid (the preset grid) where the laser point N is located are (1, 1), and the coordinates of the target grid hit by the laser point N in the direction of the observation ray ON are (1, 1).

To sum up, in the third embodiment, on the basis that the observation ray passes through the vertex of the preset grid, specifically after passing through the laser point and then passing through the vertex of the preset grid, the target grid hit by the laser point in the direction of the observation ray is adjusted to a grid with only one common vertex with the preset grid. Specifically, it can be the upper left neighborhood grid of the preset grid, the upper right neighborhood grid of the preset grid, the lower left neighborhood grid of the preset grid, and the lower right neighborhood grid of the preset grid. The target grid is specifically determined by the direction of the observation ray, thus extending the hit form of the laser point within the corresponding rectangular area.

Each type of the target grid can be determined in the manner corresponding to the third embodiment, which will not be repeated here.

It should be noted that, in the third embodiment, when the laser point N falls on the edge of the grid, a determination method of the target grid is basically the same as the determination method of the target grid in the aforementioned preferred embodiment. Therefore, the relevant descriptions about the preset intersection point and the distance ratio calculation can refer to the foregoing first embodiment, which will not be repeated here.

As a fourth embodiment, different from the scenarios described in the first embodiment and the second embodiment, the grid positioning method further comprises: when the observation ray coincides with the edge of the grid in the two-dimensional grid map, if the laser point is not located at the vertex of the grid, one of the two grids with the edge of the grid where the laser point is located as the common side is selected as the target grid hit by laser point in the direction of the observation ray. As shown in FIG. 4, the observation point is marked as point O, the laser point collected and converted by the laser sensor is marked as point P, the laser point P is located on the edge of the grid, and the observation point O points to the laser point P to form the observation ray OP. The edge of the grid where the laser point P is located is taken as the common edge, and either of the grid on the left edge of the common edge and the grid on the right edge of the common edge can be used as the target grid of the laser point P in the direction of the observed ray OP. Correspondingly, in the map coordinate system shown in FIG. 4, the coordinates of this grid are represented as the coordinates of a lower left corner point of the grid, the coordinates of the grid on the left of the common edge are (1, 2), and the coordinates of the grid on the right of the common edge are (2, 2). In this situation, there is no need to calculate the ratio between the corresponding distances generated by the intersection of the observation ray and the same grid, so as to facilitate the determination of the grid actually hit by the laser point.

In the fourth embodiment, the grid positioning method further comprises: in the case that the observation ray coincides with the edge of the grid in the two-dimensional grid map, if the laser point is located at the vertex of the grid, then among four grids with the vertex where the laser point is located as the common vertex, one of the two grids farthest from the observation point is selected as the target grid hit by the laser point in the direction of the observation ray, wherein the two grids farthest from the observation point are two adjacent grids located in the same row or in the same column. The two grids farthest away from the observation point are symmetrically distributed with respect to the observation ray, and the vertical distance from the observation point to the centers of the two grids is equal.

As shown in FIG. 4, the observation point is marked as point O, the laser point collected and converted by the laser sensor is marked as point F, the laser point P is located at the vertex of the grid, the observation point O points to the laser point F to form an observation ray OF, and the observation ray OF coincides with the edge of the grid passing through the vertex F in the Y-axis direction. Among the four grids with the vertex where the laser point F is located as the common vertex, one of the two grids in the upper row of the laser point F is selected as the target grid hit by the laser point in the direction of the observed ray, and the two grids in the upper row of the laser point F are the two grids farthest from the observation point among the four grids with the vertex where the laser point F is located as the common vertex. Correspondingly, in the map coordinate system shown in FIG. 4, coordinates of a lower left corner point of the grid are used to represent the coordinates of this grid, then the coordinates of the grids where the laser point F is located among the four grids whose vertices are common vertices are (1, 2), (2, 2), (1, 3) and (2, 3) in the counter-clockwise direction. Since the observation point O is located below the X axis (in the negative direction of the Y axis), the two grids farthest from the observation point are the grid with coordinates (1, 3) and the grid with coordinates (2, 3). In this embodiment, the distance between the center position of the grid with coordinates (1, 3) and the observation point is equal to the distance between the center position of the grid with coordinates (2, 3) and the observation point. The distance between the center position of the grid with coordinates (1, 2) and the observation point is equal to the distance between the center position of the grid with coordinates (2, 2) and the observation point. The distance between the center position of the grid with coordinates (1, 3) and the observation point is greater than the distance between the center position of the grid with coordinates (1, 2) and the observation point, which means that compared with the grid with coordinates (1, 2), the grid with coordinates (1, 3) is farther from the observation point. Therefore, in the fourth embodiment, on the premise that the observation ray coincides with the edges of the grids in the two-dimensional grid map, one of the two associated grids with common edges or common vertices is selected as the target grid according to the distance from the observation point, to shorten the distance between the target grid and the actual physical location expected to be positioned.

It should be noted that a three-dimensional image is a special form of information expression, which is characterized by three-dimensional data in the expressed space. Compared with two-dimensional images, three-dimensional images can realize the decoupling of natural objects and backgrounds with the help of information in the third dimension.

The point cloud disclosed in the present invention is directly or indirectly collected by a certain measurement method, conforms to the measurement rules, and can describe the dense point set of the surface characteristics of the target. The three-dimensional grid map can use voxels with three dimensions and the same size (voxel), also named voxel grid. For example, in the scene of a three-dimensional grid map, a voxel grid is a data structure that uses a fixed-size cube or cube as the smallest unit to represent a three-dimensional object. Therefore, voxels can also be regarded as point clouds in point cloud maps.

As an embodiment, the present invention also discloses a voxel positioning method based on the laser observation direction. The executing subject of the voxel positioning method is a mobile robot equipped with a laser sensor, wherein the laser sensor is used to collect the laser information of the scanned object, and the laser information is converted by the controller inside the mobile robot into a point in the map constructed in time. This point can represent the grid serial number of the grid in the scanned position, which is transferred from the world coordinate system to the three-dimensional grid coordinate system. A grid serial number has three quantities x, y and z.

The voxel positioning method comprises: selecting two preset intersection points that are in a preset voxel as the laser point. In some embodiments, two preset intersections of the laser point in the same preset voxel can be searched along the direction of the observed ray, wherein the first preset intersection point and the second preset intersection point are both the intersection points of the observation ray and the corresponding face of the preset voxel. In this embodiment, the first preset intersection point and the second preset intersection point may be respectively located on different faces of the cube corresponding to the preset voxel, but the observation ray does not coincide with the edge of the voxel. Specifically, the observation ray does not coincide with any edge of the preset voxel. On the observation ray, the laser point and the aforementioned two preset intersection points are in the same voxel, including the face of the voxel, or the interior of the space area surrounded by the 8 faces of the voxel (but not including face itself). This embodiment defines this type of voxel as a preset voxel. The observation ray is a ray directed from an observation point to a laser point, and the observation point is the spatial location marked by the laser sensor in the three-dimensional grid map. Among them, the laser point is the laser point cloud converted from the laser reflection information collected by the laser sensor into the three-dimensional grid map. In this embodiment, the face of a voxel is an abbreviation for the face of a cube forming the voxel.

In some embodiments, the first preset intersection point and the second preset intersection point may also be located on the same face of the cube corresponding to the preset voxel, and on different edges of the face. The specific implementation method may be referred to the foregoing first to fourth embodiments to find the target grid.

Then, among the aforementioned two preset intersections, the preset intersection farthest from the observation point is set as the first preset intersection, and the preset intersection closest to the same observation point is set as the second preset intersection, On the observation ray, the distance between the first preset intersection point and the observation point is greater than the distance between the second preset intersection point and the observation point. In this embodiment, the distance between the first preset intersection point and the second preset intersection point is set as a first preset distance, and the distance between the laser point and the second preset intersection point is set as a second preset distance.

Then, according to a magnitude relationship between a ratio of a second preset distance to a first preset distance and a preset proportion coefficient, the target voxel hit by the laser point in the direction of the observation ray is determined, so as to form a latest hit voxel of the laser point within the three-dimensional grid map, that is, the latest hit voxel position, to realize obtaining a voxel with a smaller positioning error from the actual physical position in the three-dimensional grid map. Thus, the voxel along the observation ray within a reasonable distance in the vicinity of the currently hit voxel in the map can be configured as a target voxel, and the target voxel can be updated as the latest hit voxel in the map. Among them, the specific setting of the preset proportion coefficient can be adaptively adjusted according to the actual test results to adapt to the error existing in the three-dimensional grid map constructed by the robot. Specifically, the three-dimensional space image is divided by the three-dimensional grid map constructed by the laser according to the grid resolution. The environmental information represented by the map will deviate from the actual situation. For example, there are problems such as jagged straight line segments in the map, layered superposition of line segments, and noise in line segments.

It should be noted that the laser point is the point cloud collected by the laser sensor and converted from the laser information reflected from the scanned object to the grid map. The laser point belongs to the laser scanning point or laser sampling point, reflecting the position information (including detection distance and detection angle to the scanned object surface) and laser reflection intensity. Specifically, if the laser sensor scans the laser beam to the scanned object according to a certain trajectory, it will record the reflected laser information while scanning. Because the scanning is extremely fine, a large number of laser points can be obtained, so a laser point cloud can be formed. Among them, the laser sensor is generally a laser radar that supports 360-degree rotation scanning, with a laser emitting probe and a receiving probe. In some implementations, after the laser point is processed, the specific surface features encountered by the laser can be classified, and then the floor, furniture, walls, and any objects encountered by the laser beam during the measurement process in the room constitute the data of the laser point cloud, to realize the determination of the position of these objects. Specifically, the laser information reflected from the scanned object collected by the laser sensor comprises a data packet of a laser radar, and the data packet of the laser radar comprises data of several frames of laser point cloud, and the data of each frame of laser point cloud comprises several scanning points. Each scanning point contains angles (counterclockwise is in the positive direction) and distances.

On the basis of the above embodiment, the method for determining the target voxel hit by the laser point in the direction of the observation ray according to a magnitude relationship between a ratio of a second preset distance to a first preset distance and a preset proportion coefficient comprises: when the ratio of the second preset distance to the first preset distance is greater than the preset proportional coefficient, it is determined that the target voxel hit by the laser point in the direction of the observation ray is the neighborhood voxel of the preset voxel in the direction of the observation ray, which is also the nearest voxel to the laser point searched along the direction of the observation ray; when the ratio of the second preset distance to the first preset distance is not greater than the preset proportion coefficient, it is determined that the target voxel hit by the laser point in the direction of the observation ray is the preset voxel, so that the original voxel where the laser point is located is used as the target voxel. The direction of the observation ray is the direction from the observation point to the laser point, which is used to represent a laser observation direction emitted by the observation point, so as to select voxels with a smaller gap with the actual physical location from the direction dimension, which can improve positioning accuracy and mapping quality. Based on the aforementioned, when the correlation distance ratio is greater than 0, the preset proportional coefficient is preferably greater than 0.

To sum up, compared with the prior art, the present invention sets the location of the laser sensor as an observation point, and then select two intersection points having significant meaning on positioning and distance from the intersection points of the voxel and the ray formed by the observation point pointing to the laser point in the grid map along the laser observation direction of the observation point pointing to the laser point that falls into the map Then, a ratio of the distance between the intersection point with the closest distance to the observation point and the laser point and the straight-line distance between the above two intersection points is used to determine the voxel grid position of the laser point in the map that is latest hit. The above forms the concept of map positioning that determines a voxel grid position hit by the laser point in the map according to the proximity of the laser point to the surrounding voxels, so as to realize a spatial distribution position with smaller positioning error with the actual physical position in the three-dimensional grid map.

Figure 5:
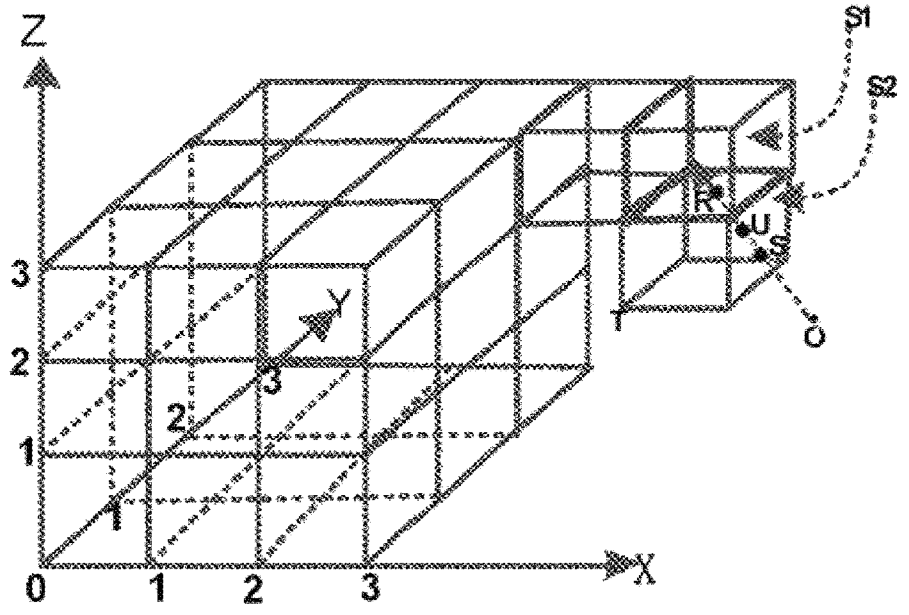
FIG. 5 is a schematic diagram of a ray OU passing through a voxel in a three-dimensional grid map disclosed by an embodiment of the present invention.
Figure 6:
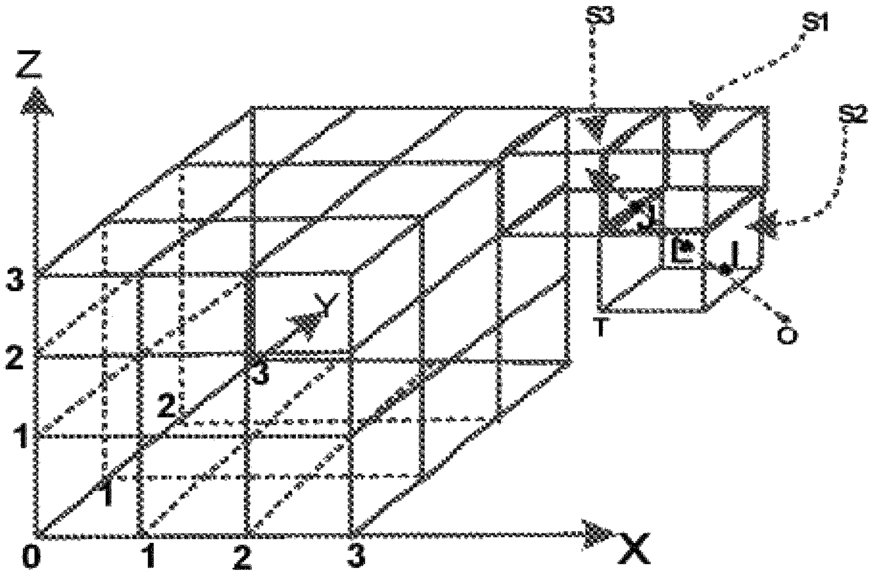
FIG. 6 is a schematic diagram of the ray OL passing through a voxel in a three-dimensional grid map disclosed by an embodiment of the present invention.

Combining the three-dimensional grid maps in FIG. 5 to FIG. 6, it can be known that the voxels in the illustrated three-dimensional grid map are regularly arranged, and each voxel in the three-dimensional grid map is regularly arranged in rows and columns within each layer of the Z-axis. The point O is used as the grid position occupied by the laser sensor of the robot. In this embodiment, the neighborhood voxels of the preset voxel are voxels that have a common edge or common vertex with the preset voxel. Therefore, the voxel S2 in FIG. 5 and FIG. 6 is the preset voxel. The manner in which the laser point is located in the preset voxel comprises that the laser point is located in the space area surrounded by the eight faces of the preset voxel, and the laser point is located on a face of the preset voxel, wherein the form that the laser point is located on a face of the preset voxel includes that the laser point is located at a vertex of the preset voxel, so as to reflect the three-dimensionality location information of the surface of the scanned object. It should be noted that, in the above embodiment, the neighborhood voxel of the preset voxel in the direction of the observation ray is one neighborhood voxel that is searched from the preset voxel along the direction of the observation ray. The direction of the observation ray is indicated by the arrow of ray OL in FIG. 6, or the direction of the observation ray is indicated by the arrow of ray OU in FIG. 5. Therefore, along the direction of the preset observation ray, the target voxel is searched from the surrounding area of the laser point including the voxel position where the laser point is located, and the hitting efficiency of the laser point in the three-dimensional grid map is accelerated.

Specifically, if the serial number of the abscissa axis direction of the preset voxel is obtained as s0, and the serial number of the ordinate axis direction of the preset grid is h0, and the serial number of the applicate axis direction of the preset voxel is z0, then in the three-dimensional grid map, the neighborhood grid of the preset grid exists in the numerical range of the serial number in the abscissa axis direction is [s0-1, s0+1], and the numerical range of the serial number in the ordinate axis direction is [h0−1, h0+1], and the numerical range of the serial number in the applicate axis direction is [z0-1, z0+1]. Therefore, on the premise that s0, h0 and z0 are known, from the ordinate axis direction, the numerical range of the serial number is [h0−1, h0+1], the numerical range of the serial number in the abscissa axis direction is [s0−1, s0+1], and the serial number in the applicate axis direction is [z0−1, z0+1]. Among the voxels, the preset voxels are excluded, and the remaining voxels are the neighborhood voxels of the preset voxels, so that the laser point has a voxel matching the serial number of the abscissa axis, the serial number of the ordinate, and the serial number of the applicate in the three-dimensional grid map, wherein s0 is an integer, h0 is an integer, and z0 is an integer, so as to construct the three-dimensional grid map shown in FIG. 5 to FIG. 6.

Preferably, in the three-dimensional grid map shown in FIG. 5, the abscissa axis serial number of the voxel S2 where the U point of FIG. 5 is located is 4, the ordinate axis serial number of the voxel S2 in FIG. 5 is 2, and the applicate axis serial number of the voxel S2 in FIG. 5 is 1.

Preferably, in the three-dimensional grid map shown in FIG. 6, the voxel where the L point in FIG. 6 is located is also voxel S2, then the neighborhood voxels of voxel S2 in FIG. 5 comprise, excepting the voxel S2, voxels of which a numerical range of the serial number in the abscissa axis direction is [3, 5], a numerical range of the serial number in the ordinate axis direction is [1, 3], and a numerical range of the serial number in the applicate axis direction is [0, 2]. Therefore, in this embodiment, an unique voxel can be determined according to the serial number of the abscissa axis, the serial number of the ordinate axis, and the serial number of the applicate axis in the three-dimensional grid map.

Generally, in the map coordinate system of the three-dimensional grid map, that is, in the three-dimensional grid coordinate system, the coordinates of each voxel are represented by the coordinates of one of the vertices of the voxel, comprising using the coordinates of the lower-left corner vertices, the coordinates of the upper-left corner vertices, the coordinates of the lower-right vertices, or the coordinates of the upper-right corner vertices to represent the coordinates of the voxel. In some implementation scenarios, the center position of the voxel corresponds to the real geography of the scanned area position. Therefore, the coordinates of each voxel will be represented by the coordinates of the center position of the voxel. The coordinates of the relevant vertices and the central position of the voxel represent the serial number of the abscissa axis, the serial number of the ordinate axis and the serial number of the applicate axis of the voxel in the three-dimensional grid map. The abscissa coordinate is equal to the serial number of the abscissa axis, the ordinate coordinate is equal to the serial number of the ordinate axis, and the applicate coordinate is equal to the serial number of the applicate axis. As shown in the three-dimensional grid maps of FIG. 5 to FIG. 6, when traversing voxels from left to right, the corresponding serial number of an abscissa axis direction gradually increases; when traversing voxels from front to back, the serial number of an ordinate axis direction gradually increases; when traversing the voxels from bottom to top, the serial number of an applicate axis direction gradually increases; thereby ensuring that the paths generated by voxel-by-voxel connections in the three-dimensional grid map are continuous.

For ease of understanding, in the map coordinate system shown in FIG. 5 to FIG. 6, the coordinates of the lower left corner vertex of the voxel are used to represent the coordinates of the voxel, and the coordinates of voxel S2 are represented using those of the vertex T in FIG. 5 and FIG. 6. Therefore, the coordinates of the voxel S2 are specifically (4, 2, 1).

As a fifth embodiment, as shown in FIG. 5, the observation point is marked as point O, the laser point collected and converted by the laser sensor is marked as point U, the observation point O points to the laser point U to form an observation ray OU, and the voxel where the laser point U is located is the preset voxel S2. The observation ray OU intersects the corresponding face of the preset voxel S2 at point V and point R, that is, the observation ray OU intersects one voxel at point V and point R, and the observation ray OU does not coincide with any edge of the preset voxel. The distance between point R and observation point O is greater than the distance between point S and observation point O, then the distance between point R and point V is defined as the first preset distance RV, the distance between point V and laser point U is defined as the second preset distance VU, the first preset intersection point is marked as point R, and the second preset intersection point is marked as point V. On this basis, along the direction of the observation ray OU, the first preset intersection point R, the second preset intersection point V and the laser point U located in the same preset voxel S2 can be selected, and the first preset intersection point R and the second preset intersection point V can be understood as the mapping point of the laser point U on the intersection face of the observation ray OU and the voxel S2. In the fifth embodiment, when the ratio of the second preset distance VU to the first preset distance RV is greater than the preset proportional coefficient, it is determined that the target voxel hit by the laser point U in the direction of the observation ray OU is the neighborhood voxel S1 of the preset voxel S2 in the direction of the observation ray OU, which is a voxel closest to the laser point U searched along the direction of the observation ray OU. Correspondingly, in the map coordinate system shown in FIG. 5, the coordinates of the lower left corner vertex of the voxel are used to represent the coordinates of the voxel, then the coordinates of the voxel S2 where the laser point U is located are (4, 2, 1), and the coordinates of the target voxel S1 hit by the laser point U in the direction of the observation ray OU are (4, 2, 2). In the fifth embodiment, when the ratio of the second preset distance VU to the first preset distance RV is not greater than the preset proportional coefficient, it is determined the target voxel hit by the laser point U in the direction of the observation ray OU is the preset voxel S2. Correspondingly, in the map coordinate system shown in FIG. 5, the coordinates of the voxel are represented by the coordinates of the lower left vertex of the voxel, then the coordinates of the voxel S2 where the laser point U is located are (4, 2, 1), and the coordinates of the target voxel hit by the laser point U in the direction of the observation ray OU are (4, 2, 1). Obtaining the voxel position with smaller distance error from the actual physical location in the three-dimensional grid map is thus realized.

On the basis of the foregoing embodiments, when the ratio of the second preset distance to the first preset distance is greater than the preset proportional coefficient, it can be deduced that the direction of the observation ray determines that the distribution direction of the target voxel hit by the laser point in the direction of the observation ray relative to the preset voxel in which the laser point is located, which is referred to as the neighborhood voxel direction, includes the direction indicated by the arrow of the ray shown in FIG. 5 to FIG. 6. The neighborhood voxel direction can be divided into the directions from the preset voxel to its surrounding adjacent 26 neighborhood voxels, that is, the neighborhood voxel direction is divided into 26 different directions, each direction is pointing to a neighborhood voxel. It should be noted that, each the neighborhood voxel direction, the target voxel corresponding to the direction of the observation ray can be determined by referring to the fifth embodiment corresponding to FIG. 5. No drawings nor texts will be made for description here, and just the relevant observation rays and grids in the second embodiment are adaptively adjusted.

As a preferred embodiment, when the laser point is located on the face of the voxel in the three-dimensional grid map, the laser point is the second preset intersection point. In this preferred embodiment, the laser point can only be set as the second preset intersection point, and the laser point can only be used as a preset intersection point which is closest to the same observation point among the two preset intersection points where the observation ray intersects with the corresponding two faces of the voxel (the preset voxel), wherein the observation ray does not coincide with any edge of the voxel. According to the voxel positioning method described in the fifth embodiment above, it can be known that the ratio of the second preset distance to the first preset distance is equal to 0, wherein the preset proportional coefficient is greater than 0, so that the target voxel hit by the laser point U in the direction of the observation ray OU is the preset voxel. Therefore, when the laser point falls on the face of the voxel, the first voxel passed by the observation ray after passing through the laser point is selected as the target voxel, so as to bring closer the distance between the laser point and the target voxel. Referring to FIG. 5, a shifting of the position of the laser point U can be explained. When the laser point U falls into the position of point V, the observation ray OU intersects the corresponding face of the preset voxel S2 at points U and Point R, the second preset intersection point can only be marked as point U, then the first preset intersection point is marked as point R, and then the distance between point U and point R is defined as the first preset distance UR, and the distance between point U and laser point U is defined as the second preset distance. Therefore, the second preset distance is equal to 0, and the ratio of the second preset distance to the first preset distance is equal to 0, which is less than the preset proportional coefficient. In this situation, the preset voxel (4, 2, 1) is selected as the target voxel hit by the laser point U in the direction of the observation ray OU, wherein, the preset proportional coefficient is greater than 0.

When the laser point falls on the face of the voxel, according to the aforementioned concept of selecting the first voxel that the observation ray passes through the laser point as the target voxel, continuing to refer to FIG. 5 can explain a shifting of the position of the laser point U. When the laser point U falls into the position of point R, the observation ray OU intersects the corresponding face of the preset voxel S2 at point U and point V, and the observation ray OU intersects the corresponding face of voxel (4, 2, 2) at point U and a new point. In this situation, the new intersection point is located on a plane perpendicular to the horizontal plane. Then, voxel (4, 2, 2) is updated to the preset voxel, the second preset intersection point is marked as point U, and the first preset intersection point is marked as the aforementioned new intersection. Because the distance between the second preset intersection point U and the laser point U is equal to 0, the second preset distance is equal to 0. Therefore, the ratio of the second preset distance to the first preset distance is equal to 0, which is smaller than the preset scale factor. In this situation, the voxel (4, 2, 2) is selected as the target voxel hit by the laser point U in the direction of the observation ray OU. The preset proportional coefficient is greater than 0, wherein, voxel (4, 2, 2) is a voxel with coordinates (4, 2, 2), and voxel (4, 2, 1) is a voxel with coordinates (4, 2, 1).

As a sixth embodiment, the first preset intersection point and the second preset intersection point are located on the edge of the preset voxel. In this situation, the first preset intersection point and/or the second preset intersection point can be located at the vertex of the preset voxel, so that the target voxel has only one common vertex or one common edge with the preset voxel. Specifically, as shown in FIG. 6, the observation point is marked as point O, the laser point collected and converted by the laser sensor is marked as point L, the observation point O points to the laser point L to form an observation ray OL, and the voxel where the laser point L is located is the preset voxel, the observation ray OL intersects the corresponding face of the preset voxel at point I and point J, wherein the observation ray OL intersects the edge above the left side of the preset voxel at point J, the observation ray OL intersects the right side of the preset voxel at point I. In some embodiments, point I may be on the edge below the right side of the preset voxel, but the line segment IJ is not located on a face of the preset voxel. Since the distance between point J and observation point O is greater than the distance between point I and observation point O, the first preset intersection point is marked as point J, and the second preset intersection point is marked as point J, the distance between point I and point J is defined as the first preset distance IJ, and the distance between point I and laser point L is defined as the second preset distance IL. On this basis, the first preset intersection J, the second preset intersection I and the laser point L of the same preset voxel can be selected along the direction of the observed ray OL. The first preset intersection point J and the second preset intersection point I can be understood as the mapping point of the laser point L on the face where the observation ray OL intersects the corresponding voxel. In the sixth embodiment, when the ratio of the second preset distance IL to the first preset distance IJ is greater than the preset proportional coefficient, it is determined that the target voxel hit by the laser point L in the direction of the observation ray OL is the neighborhood voxel of the preset voxel in the direction of the observation ray OL, which is the voxel closest to the laser point L searched along the direction of the observation ray OL. That is, the voxel S3 in FIG. 6 is located at the upper left of the preset voxel S2 and has only one common edge with the preset voxel. Correspondingly, in the map coordinate system shown in FIG. 6, the coordinates of the lower left vertex of the voxel represent the coordinates of this voxel, and thus the coordinates of the voxel S2 where the laser point L is located is (4, 2, 1), and the coordinates of the target voxel hit by the laser point L in the direction of the observation ray OL are (3, 2, 2). In the sixth embodiment, when the ratio of the second preset distance IL to the first preset distance IJ is not greater than the preset proportional coefficient, it is determined that the target voxel hit by the laser point L in the direction of the observation ray OL is the neighborhood voxel of the preset voxel in the direction of the observed ray OL, which is a voxel closest to the laser point L searched along the direction of the observed ray OL. Correspondingly, in the map coordinate system shown in FIG. 6, the coordinates of the vertex at the lower left corner of the voxel represent the coordinates of this voxel, and thus the coordinates of the voxel S2 where the laser point L is located are (4, 2, 1), and the coordinates of the target voxel hit by the laser point L in the direction of the observation ray OL are (4, 2, 1).

To sum up, in the sixth embodiment, on the basis of the observation ray passing through the edge of the preset voxel, specifically passing through the edge of the preset voxel after passing through the laser point, wherein the laser point is not located on either face of the preset voxel, the target voxel hit by the laser point in the direction of the observation ray is adjusted to a voxel that has only one common edge with the preset voxel. Specifically, it can be four neighborhood voxels with the same applicate coordinates as the preset voxels and with only one common edge present, four neighboring voxels with the same abscissa as the preset voxel and only one common edge, and four neighboring voxels with the same ordinate coordinates as the preset voxels and only one common edge. The determined target voxels are specified by the direction of the observation ray, wherein each type of target voxel can be determined according to the manner corresponding to the sixth embodiment. Specifically, the four neighborhood voxels that have the same ordinate as the preset voxel and only one common edge include a neighborhood voxel in the upper left of the preset voxel (a neighborhood voxel with the common edge that is the upper edge of the left face of the preset voxel), a neighborhood voxel in the upper right of the preset voxel (a neighborhood voxel of the common edge that is the upper edge of the right face of the preset voxel), a neighborhood voxel in the lower left of the preset voxel (a neighborhood voxel with the common edge that is the lower edge of the left face of the preset voxel) and a neighborhood voxel in the lower right of the preset voxel (a neighboring voxel with the common edge that is the lower edge on the right face of the preset voxel). Four neighborhood voxels that have the same abscissa as the preset voxels and only one common edge include a neighborhood voxel below the front of the preset voxel (a neighborhood voxels having a common edge with the lower edge of the front face of the preset voxel), a neighborhood voxel above the front of the preset voxel (a neighborhood voxels having a common edge with the edge above the front face of the preset voxel), a neighborhood voxel above the rear of the preset voxel (a neighborhood voxel having a common edge with the upper edge on the back face of the preset voxel) and a neighborhood voxel below the rear of the preset voxel (a neighborhood voxel having a common edge with the lower edge of the back face of the preset voxel). Four neighborhood voxels that have the same applicate coordinates as the preset voxel and only one common edge include a neighborhood voxel at the left front of the preset voxel (a neighborhood voxel having a common edge with the right edge of the left face of the preset voxel), a neighboring voxel in the right front of the preset voxel (a neighborhood voxel having a common edge with the left edge of the right face of the preset voxel), a neighborhood voxel behind the left side of the preset voxel (a neighborhood voxel having a common edge with the left edge of the left face of the preset voxel) and a neighborhood voxel behind the right side of the preset voxel (a neighborhood voxel having a common edge with the right edge of the left face of the preset voxel). The hit form of the laser point in the corresponding cubic area is thus expanded.

In the foregoing sixth embodiment, when the first preset intersection point and/or the second preset intersection point are located at the vertices of the preset voxel, referring to FIG. 6, the position of the first preset intersection J is understood by shifted. The first preset intersection point J is updated to the vertex position of the same edge, and the observation ray OL intersects the right side of the voxel S2 at point I. In some embodiments, point I can be on the edge below the right side of the preset voxel but not at its vertex; the observation ray OL intersects the vertex above the left face of voxel S2 at point J, the distance between point I and point J is defined as the first preset distance IJ, the distance between the point I and the laser point L is defined as the second preset distance IL, the observation ray OL points to and passes through the neighborhood voxels having the common vertex with the vertex J of the voxel S2. When the ratio of the second preset distance IL to the first preset distance IJ is greater than the preset proportional coefficient, it is determined that the target voxel hit by the laser point L in the direction of the observation ray OL is a neighborhood voxel of the preset voxel in the direction of the observation ray OL, which is a neighborhood voxel having the common vertex with the vertex J of the voxel S2. Therefore, in the sixth embodiment, on the basis that the observation ray passes through the vertex of the preset voxel, specifically, the observation ray passes through the vertex of the preset voxel after passing through the laser point, wherein the laser point is not located on a face of the preset voxel, the target voxel hit by the laser point in the direction of the observation ray is adjusted to a voxel having only one common vertex with the preset voxel, which belongs to neighborhood voxels respectively having only one common vertex with the 8 vertices of the preset voxel. There are 8 neighborhood voxels to be chosen, and specifically it is selected by the direction of the observation ray, so as to expand the hit form of the laser point on the target voxel in the corresponding cubic region. Each type of target voxel can be determined in the manner corresponding to the sixth embodiment, which will not be repeated here.

It should be noted that, in the foregoing sixth embodiment, when the laser point L falls on the face of a voxel, the determination method of the target voxel is basically the same as that of the target grid in the foregoing preferred embodiment. Therefore, the relevant description about the preset intersection point and the distance ratio operation can refer to the foregoing fifth embodiment or sixth embodiment and will not be repeated here.

As a seventh embodiment, different from scenarios described in fifth embodiment and the sixth embodiment, the voxel positioning method further comprises: in the case where the observation ray is located on a face of a voxel in the three-dimensional grid map, referring to FIG. 5 and FIG. 6, placing the laser point on the surface of the voxel for replacement understanding. There are the following steps: In the case where the observation ray does not coincide with an edge of the voxel in the three-dimensional grid map, if the laser point is not located at a vertex of the voxel, then one of two voxels with a common face where the laser point is located is selected as the target voxel hit by the laser point in the direction of the observed ray. Specifically, in the case that it is determined that the observation ray enters the three-dimensional grid map along the face of the voxel and passes through the face of the voxel, after determining that the laser point does not fall into the vertex of the voxel, schematically, in the map coordinate system shown in FIG. 5, the coordinates of the lower left corner vertex of a voxel are used to represent the coordinates of the voxel. The abscissa (serial number in a horizontal direction) corresponding to a face of the voxel where the laser point falls in is 2, the coordinates of the voxel on the left side of the face where the laser point is located are (1, 1, 1), and the coordinates of the voxel on the right side of the face where the laser point is located are (2, 1, 1). In this situation, both of the voxel with coordinates (1, 1, 1) and the voxel with coordinates (2, 1, 1) can be used as the target voxel. Therefore, this embodiment does not need to calculate the ratio between the corresponding distances generated by the intersection of the observation ray and the same voxel, does not need to perform threshold comparison, and thus can speed up the determination of the voxel hit by the laser point.

In the case where the observation ray coincides with an edge of the voxel in the three-dimensional grid map, if the laser point is not located at one vertex of the voxel, one of four voxels having a common edge with the edge of the voxel where the laser point is located is selected as the target voxel hit by the laser point in the direction of the observation ray. Specifically, when it is determined that the observation ray enters the three-dimensional grid map along the edge of the voxel, after it is determined that the laser point does not fall into the vertex of the voxel, schematically, in the map coordinate system shown in FIG. 5, the coordinates of the voxel are represented by the coordinates of the lower left corner vertex of the voxel. The coordinates of the four voxels having a common edge with the edge of the voxel where the laser point is located are (1, 0, 1), (2, 0, 1), (2, 1, 1) and (1, 1, 1) in counterclockwise order. Since the four voxels are symmetrically arranged in the three-dimensional grid map with respect to the observation ray, the vertical distances from the observation point to these four voxels are all equal, which means that the degree of distance of the four voxels deviate from the observation point is the same and will not be affected by the direction of the observation ray. Therefore, one of the four voxels whose common edge is the edge of the voxel where the laser point is located is selected as the target voxel hit by the laser point in the direction of the observation ray.

If the laser point is located at the vertex of the voxel, then among the eight voxels having a common vertex with the vertex where the laser point is located, one of the eight voxels with the largest vertical distance from the observation point is selected as the target voxel hit by laser point in the direction of the observation ray, wherein the edge of the observation ray and the voxel in the three-dimensional grid map may or may not coincide. Specifically, when it is determined that the observation ray enters the three-dimensional grid map from a vertex of a voxel, schematically, in the map coordinate system shown in FIG. 5, the coordinates of the voxel are represented by the coordinates of the lower left corner vertex of the voxel. The coordinates corresponding to the vertices of the voxel where the laser point falls are (1, 1, 1), and the observation point is located below the XOY coordinate plane, so that the direction of the observation ray crosses, within the preset plane of the voxel, from the bottom to the top (1,1,1). The vertex (1, 1, 1) is the vertex of the preset plane. Therefore, the angle of the positive Y-axis deviation of the observation ray is greater than 0 degrees but less than 90 degrees. The plane where the preset plane is located passes through the coordinates (1, 0, 0) of the X axis. Among the eight grids with the vertex where the laser point is located as the common vertex, four voxels distributed on one side of the preset plane are respectively symmetrical to four corresponding voxels on the other side of the preset plane with respect to the preset plane, and the distances from the observation point to the center of two voxels exit an equal. Then, the coordinates of the eight voxels with the vertex where the laser point is located as the common vertex comprise (0, 0, 0), (1, 0, 0), (1, 1, 0) and (0, 1, 0) in counterclockwise order belonging to the coordinates of a layer of voxels whose applicate is 0, and (0, 0, 1), (1, 0, 1), (1, 1, 1) and (0, 1, 1) in counterclockwise order belonging to the coordinates of a layer of voxels whose applicate is 1. Therefore, compared to a layer of voxels with a applicate of 0, the center of a layer of voxels with a applicate of 1 is farther from the observation point. When the observation ray has a tendency to extend in the positive direction of the Y-axis within the preset plane, the voxel with coordinates (1, 1, 1) and the voxel with coordinates (0, 1, 1) can be used as the target voxels hit by the laser point in the direction of the observation ray. When the observation ray has a tendency to extend in the negative direction of the Y-axis within the preset plane, both of the voxel with coordinates (0, 0, 1) and the voxel with coordinates (1, 0, 1) can be used as the target voxel hit by the laser point in the direction of the observation ray.

In summary, in the seventh embodiment, under the premise that the observation ray is located on one face of a voxel in the three-dimensional grid map, that is, the observation ray is configured not to pass through different faces of the same voxel, the target voxel is determined based on the distance from the observation point, which expands the range of area selection of the target voxel hit by the laser point.

The invention also discloses a robot, the robot comprises: a robot main body; a walking mechanism arranged on the robot main body; a laser sensor arranged on the robot main body, the laser sensor being configured to collect laser information reflected from a scanned object to obtain laser points so as to form a laser point cloud; a controller that is equipped in the robot main body and connected to the laser sensor and comprises at least one processor and a memory. The memory is connected in communication with the at least one processor, and the memory stores instructions that can be executed by the at least one processor. The instructions are executed by the at least one processor, so that the robot implements a grid positioning method based on the laser observation direction disclosed in the foregoing embodiments, including implementing the first embodiment to the fourth embodiment; and/or implements a voxel positioning method based on the laser observation direction of the foregoing embodiments, including implementing the fifth embodiment to the seventh embodiment. The position represented by the target grid or target voxel selected by the robot is close to the actual physical position, which can improve the positioning accuracy and mapping quality.

It should be noted that the robot is a self-moving robot, including but not limited to a laser navigation robot and a visual navigation robot. The at least one processor may include a program storing area and a data storing area, wherein the program storing area may store an operating system, an application program required by at least one function; the data storing area can store the coordinate data needed to build a two-dimensional grid map and a three-dimensional grid map. In addition, the at least one processor may include a high-speed random access memory, and may also comprise a non-volatile memory, such as at least one magnetic disk storage device, flash memory device, or other non-volatile solid-state storage devices. In some embodiments, the at least one processor optionally comprises memory located remotely from the corresponding processor. The remote memory may be connected to the robot via a network. Examples of the aforementioned networks include, but are not limited to, the Internet, intranets, local area networks, mobile communication networks, and combinations thereof.

Based on the foregoing embodiments, a chip is also disclosed, the chip is stored with computer-executable instructions. When the computer-executable instructions are executed by the chip, a grid positioning method based on the laser observation direction is implemented as described to obtain a grid with a smaller positioning error from the actual physical position in the two-dimensional grid map, and/or the described voxel positioning method based on the laser observation direction, to achieve voxels with smaller positioning errors from the actual physical position within the three-dimensional grid map.

In one aspect, the present application can be implemented in software and/or a combination of software and hardware. For example, it can be implemented using an application specific integrated circuit (ASIC), a general purpose computer or any other similar hardware device. In an embodiment, the software program of the present application can be executed by a processor to realize the steps or functions described above. Likewise, the software program of the present application (including associated data structures) can be stored in a computer-readable recording medium, such as RAM memory, magnetic or optical drive or floppy disk, and the like. In addition, some steps or functions of the present application may be implemented by hardware, for example, as a circuit that cooperates with a processor to execute each step or function.

In addition, a part of the present application can be applied as a computer program product, such as a computer program instruction. When it is executed by a computer, the method and/or technical solution according to the present application can be invoked or provided through the operation of the computer. The program instructions for invoking the method of the present application may be stored in a fixed or removable recording medium, and/or transmitted through a data stream in a broadcast or other signal-carrying medium, and/or stored in a working memory of the computer device on which the program instructions described above are executed. Here, an embodiment according to the present application includes an apparatus comprising a memory for storing computer program instructions and a processor for executing the program instructions, wherein when the computer program instructions are executed by the processor, triggering the device to run the methods and/or technical solutions based on the aforementioned multiple embodiments.

Finally, it should be noted that the above embodiments are only used to illustrate the technical solutions of the present invention, rather than limiting them. Although the present invention has been described in detail with reference to the foregoing embodiments, those of ordinary skill in the art should understand that it is still possible to modify the technical solutions described in the foregoing embodiments or perform equivalent replacements for some or all of the technical features, and these modifications or replacements do not make the essence of the corresponding technical solutions deviate from the technical solutions of the various embodiments of the present invention scope.

What is claimed is:

1. A grid positioning method based on a laser observation direction, the grid positioning method comprising:

selecting two preset intersection points that are in one preset grid in which a laser point is located; then among the two preset intersection points, setting a preset intersection point farthest from an observation point as a first preset intersection point, and setting a preset intersection point closest to the observation point as a second preset intersection point; wherein both the first preset intersection point and the second preset intersection point are intersection points of an observation ray and one corresponding edge of the preset grid; and determining a target grid hit by the laser point in a direction of the observation ray according to a magnitude relationship between a ratio of a second preset distance to a first preset distance and a preset proportion coefficient, so as to form a latest hit grid position of the laser point within a two-dimensional grid map; wherein the first preset distance is a distance between the first preset intersection point and the second preset intersection point, and the second preset distance is a distance between the laser point and the second preset intersection point;

wherein, the observation ray is a ray directed from the observation point to the laser point, and the observation ray does not coincide with one edge of a grid; the observation point is a position marked by the laser sensor in the two-dimensional grid map.

2. The grid positioning method according to claim 1, wherein the step of determining a target grid hit by the laser point in the direction of the observation ray according to a magnitude relationship between a ratio of a second preset distance to a first preset distance and a preset proportion coefficient comprising:

when the ratio of the second preset distance to the first preset distance is greater than the preset proportional coefficient, determining that the target grid hit by the laser point in the direction of the observation ray is a neighborhood grid of the preset grid in the direction of the observation ray;

when the ratio of the second preset distance to the first preset distance is not greater than the preset proportional coefficient, determining that the target grid hit by the laser point in the direction of the observation ray is the preset grid;

wherein, the direction of the observation ray is a direction from the observation point to the laser point, which is used to indicate a laser observation direction emitted from the observation point.

3. The grid positioning method according to claim 2, wherein when the laser point is located on one edge of the grid, the laser point is the second preset intersection point, the ratio of the second preset distance to the first preset distance is equal to 0, so that the first grid that is continuously passed through by the observation ray after passing through the laser point becomes the target grid, wherein the preset proportional coefficient is greater than 0.

4. The grid positioning method according to claim 1, wherein the first preset intersection point and/or the second preset intersection point are allowed to be located at vertices of the preset grid, so that the target grid is a grid having only one common vertex with the preset grid;

wherein, the first preset intersection point and the second preset intersection point are respectively located on different edges of the preset grid.

5. The grid positioning method according to claim 1, the grid positioning method further comprising the following steps: in the case where the observation ray coincides with one edge of a grid in the two-dimensional grid map, if the laser point is not located at a vertex of the grid, one of two grids having a common edge where the laser point is located is selected as the target grid hit by the laser point in the direction of the observation ray;

in the case where the observation ray coincides with one edge of a grid in the two-dimensional grid map, if the laser point is located at a vertex of the grid, among four grids having a common vertex with the vertex where the laser point is located, one of two grids that are farthest from the observation point is selected as the target grid hit by the laser point in the direction of the observation ray, wherein the two grids that are farthest from the observation point are two adjacent grids located in the same row or in the same column.

6. The grid positioning method according to claim 1, wherein in a map coordinate system of the two-dimensional grid map, coordinates of each grid refer to coordinates of a lower left corner point of the grid, coordinates of the upper left corner point of the grid, coordinates of the lower right corner point of the grid, coordinates of the upper right corner point of the grid or coordinates of center position of the grid;

wherein, coordinates of corner points at a relevant edge or a central position of the grid are used to represent row serial number of the grid and column serial number of the grid in the two-dimensional grid map.

7. The grid positioning method according to any one of claim 2, wherein a neighborhood grid of the preset grid is a grid having a common edge or a common vertex with the preset grid;

a neighborhood grid of the preset grid in the direction of the observation ray is an adjacent grid searched along the direction of the observation ray taking the preset grid as a search starting point;

wherein, a formality in which the laser point is located on the preset grid comprises situations that the laser point is located in an area surrounded by four edges of the preset grid, and that the laser point is located on one edge of the preset grid, so as to reflect a two-dimensional position information of a scanned object.

8. The grid positioning method according to claim 7, wherein if a column serial number of the preset grid is obtained as s0 and a row serial number of the preset grid is obtained as h0, then in the two-dimensional grid map, a neighborhood grid of the preset grid exists in grids of which the numerical range of the row serial number is [h0−1, h0+1] and the numerical range of the column serial number is [s0−1, s0+1].

9. A voxel positioning method based on a laser observation direction, the voxel positioning method comprising:

selecting two preset intersection points that are in one preset voxel in which a laser point is located; then among the two preset intersection points, setting a preset intersection point farthest from an observation point as a first preset intersection point, and setting a preset intersection point closest to the observation point as a second preset intersection point; wherein the first preset intersection point and the second preset intersection point are both intersection points of an observation ray and one corresponding face of the preset voxel; and determining a target voxel hit by the laser point in a direction of the observation ray according to a magnitude relationship between a ratio of a second preset distance to a first preset distance and a preset proportion coefficient, so as to form a latest hit voxel of the laser point within the three-dimensional grid map; wherein the first preset distance is a distance between the first preset intersection point and the second preset intersection point, and the second preset distance is a distance between the laser point and the second preset intersection point;

wherein the observation ray is a ray directed from the observation point to the laser point, and the observation ray is configured to pass through different faces of one voxel, but the observation ray does not coincide with one edge of a voxel; and wherein the observation point is a position marked by the laser sensor in the three-dimensional grid map; the laser point is a laser point cloud converted from a laser reflection information collected by a laser sensor into the three-dimensional grid map.

10. The voxel positioning method according to claim 9, wherein the step for determining a target voxel hit by the laser point in the direction of the observation ray according to a magnitude relationship between a ratio of a second preset distance to a first preset distance and a preset proportion coefficient comprising:

when the ratio of the second preset distance to the first preset distance is greater than the preset proportional coefficient, determining that the target voxel hit by the laser point in the direction of the observation ray is a neighborhood voxel of the preset voxel in the direction of the observation ray; and when the ratio of the second preset distance to the first preset distance is not greater than the preset proportional coefficient, determined that the target voxel hit by the laser point in the direction of the observation ray is the preset voxel;

wherein, the direction of the observation ray is a direction from the observation point to the laser point.

11. The voxel positioning method according to claim 10, wherein when the laser point is located on one face of the voxel of the three-dimensional grid map, the laser point is the second preset intersection point, then the ratio of the second preset distance to the first preset distance is equal to 0, so that the target voxel hit by the laser point in the direction of the observation ray becomes the preset voxel, wherein the preset proportional coefficient is greater than 0.

12. The voxel positioning method according to claim 9, wherein the first preset intersection point and/or the second preset intersection point are located on edges of the preset voxel, so that the target voxel is a voxel having only a common vertex or a common edge with the preset voxel; and wherein, the first preset intersection point and the second preset intersection point are located on different faces of the preset voxel.

13. The voxel positioning method according to claim 9, wherein when the observation ray is located on one face of a voxel in the three-dimensional grid map, the voxel positioning method also comprises the following steps:

in the case where the observation ray does not coincide with one edge of the voxel in the three-dimensional grid map, if the laser point is not located at one vertex of the voxel, one of two voxels having a common face where the laser point is located is selected as the target voxel hit by the laser point in the direction of the observation ray;

in the case where the observation ray coincides with one edge of the voxel in the three-dimensional grid map, if the laser point is not located at one vertex of the voxel, one of four voxels having a common edge with the edge of the voxel where the laser point is located is selected as the target voxel hit by the laser point in the direction of the observation ray; and if the laser point is located at a vertex of the voxel, then among eight voxels having a common vertex with the vertex where the laser point is located, a voxel with the largest vertical distance from the observation point is selected as the target voxel hit by the laser point in the direction of the observed ray.

14. The voxel positioning method according to claim 9, wherein in a three-dimensional map coordinate system of the three-dimensional grid map, coordinates of each voxel refer to coordinates of one of vertices of the voxel or coordinates of a central position of the voxel.

15. The voxel positioning method according to any one of claim 10, wherein a neighborhood voxel of the preset voxel is a voxel that shares common edges or common vertices with the preset voxel;

a neighborhood voxel of the preset voxel in the direction of the observation ray is an adjacent voxel searched along the direction of the observation ray taking the preset voxel as a search starting point;

wherein a formality in which the laser point is located on the preset voxel includes situations that the laser point is located within a space area surrounded by eight faces of the preset voxel, and that the laser point is located on one face of the preset voxel; and wherein a formality in which the laser point is located on one face of the preset voxel includes situation that the laser point is located at a vertex of the preset voxel.

16. The voxel positioning method according to claim 15, wherein if a serial number of an abscissa axis direction of the preset voxel is s0, a serial number of an ordinate axis direction of the preset voxel is h0, and a serial number of an applicate axis direction of the preset voxel is z0, then in the three-dimensional grid map, the neighborhood voxel of the preset voxel exists in voxels of which numerical range of the serial number in the abscissa axis direction is [s0−1, s0+1], and numerical range of the serial number in the ordinate axis direction is [h0−1, h0+1], and the numerical range of the serial number in the applicate axis direction is [z0−1, z0+1], wherein s0 is an integer, h0 is an integer, and z0 is an integer.

17. A robot, the robots comprising:

a robot main body;

a walking mechanism arranged on the robot main body;

a laser sensor disposed on the robot main body, the laser sensor being configured to collect laser information reflected from a scanned object to obtain laser points, so as to form a laser point cloud; and a controller, the controller being equipped in the robot main body and connected to the laser sensor;

wherein the controller comprises:

at least one processor and a memory, the memory is connected in communication with the at least one processor, the memory stores instructions executable by the at least one processor, and the instructions are executed by the at least one processor to make the robot implement a grid positioning method described in any one of claims 1 to 8, and/or a voxel positioning method described in any one of claims 9 to 16.

18. A chip, the chip storing computer-executable instructions, wherein when the computer-executable instructions are executed by the chip, a grid positioning method according to any one of claims 1 to 8, and/or a voxel positioning method described in any one of claims 9 to 16 are implemented.

* * * * *